United States Patent
Mahimkar et al.

(10) Patent No.: US 12,402,022 B2
(45) Date of Patent: Aug. 26, 2025

(54) PERFORMANCE-DRIVEN NETWORK PARAMETER CHANGES IN A COMMUNICATION NETWORK

(71) Applicants: AT&T Intellectual Property I, L.P., Atlanta, GA (US); AT&T Mobility II LLC, Atlanta, GA (US)

(72) Inventors: Ajay Mahimkar, Edison, NJ (US); Shomik Pathak, Richardson, TX (US); Xuan Liu, Basking Ridge, NJ (US); Yusef Shaqalle, Minneapolis, MN (US); Zihui Ge, Madison, NJ (US); Yu Xiang, Morris Township, NJ (US); Changhan Ge, Austin, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 431 days.

(21) Appl. No.: 18/090,784

(22) Filed: Dec. 29, 2022

(65) Prior Publication Data
US 2024/0224072 A1 Jul. 4, 2024

(51) Int. Cl.
*H04L 12/00* (2006.01)
*H04L 41/16* (2022.01)
(Continued)

(52) U.S. Cl.
CPC ............. *H04W 24/02* (2013.01); *H04L 41/16* (2013.01); *H04W 24/10* (2013.01)

(58) Field of Classification Search
CPC ...... H04W 24/02; H04W 24/10; H04L 41/16; G06F 17/18; G06F 16/2255
(Continued)

(56) References Cited

U.S. PATENT DOCUMENTS 10,659,351 B2 * 5/2020 Anton Eichelberger .................... H04L 45/38
10,776,335 B2 * 9/2020 Wright ................ G06F 16/2255
(Continued)

FOREIGN PATENT DOCUMENTS

CN 112085252 A * 12/2020 ............. G06F 17/18

OTHER PUBLICATIONS

Mahimkar, A., et al., "Aurora: conformity-based configuration recommendation to improve LTE/5G service", IMC '22: Proceedings of the 22nd ACM Internet Measurement Conference, Oct. 2022, pp. 83-97.
(Continued)

*Primary Examiner* — Frantz Coby

(57) ABSTRACT

A processing system may obtain a data set with records of network parameter changes, each record including at least one network parameter change and at least one attribute associated with a first aspect of a communication network, and a corresponding network performance indicator change. A first record may include a plurality of network parameter change groups. The processing system may next perform a de-confusion process by identifying a second record comprising a single network parameter change group, determining that a corresponding network performance indicator change is different from that of the at least the first record, and updating the data set to replace the first record with at least two replacement records. The processing system may apply at least one of the network parameter change groups to a second aspect of the communication network based upon a decision output of a classifier that is trained using the updated data set.

20 Claims, 4 Drawing Sheets

(51) Int. Cl.
*H04W 24/02* (2009.01)
*H04W 24/10* (2009.01)

(58) Field of Classification Search
USPC ......................................................... 370/255
See application file for complete search history.

(56) References Cited

U.S. PATENT DOCUMENTS

| | | |
|---|---|---|
| 11,212,710 B1 | 12/2021 | Mahimkar et al. |
| 11,599,515 B2* | 3/2023 | Wright ................ G06F 16/2255 |
| 11,824,741 B1* | 11/2023 | Engi ........................ H04L 43/06 |
| 12,189,593 B2* | 1/2025 | Wright ................ G06F 16/2255 |
| 12,219,377 B2* | 2/2025 | Mahimkar ............ H04W 24/08 |
| 2022/0174526 A1* | 6/2022 | Mahimkar ............ H04W 24/04 |
| 2024/0224072 A1* | 7/2024 | Mahimkar ............ H04W 24/10 |
| 2025/0086157 A1* | 3/2025 | Wright ................ G06F 16/2255 |

OTHER PUBLICATIONS

Moscovitz, I., "How to Perform Explainable Machine Learning Classification—Without Any Trees", Towards Data Science, Mar. 6, 2019, 17 pages.

\* cited by examiner

210

Increase_acc: 0.97560975609756!
Condition 1:
Carriers = [ 2;AWS;10MHZ;2;AWS;5MHZ;2;AWS;15MHZ;7;700;5MHZ;7;BAND 14;10MHZ;7;700;5MHZ,
2;AWS;10MHZ;3;WCS;10MHZ;7;700;10MHZ;7;BAND 14;10MHZ;7;LAA;5MHZ;9;1900;20MHZ,
2;AWS;10MHZ;3;WCS;10MHZ;7;700;10MHZ;7;BAND 14;10MHZ;7;LAA;5MHZ;9;1900;5MHZ,
2;AWS;10MHZ;3;WCS;10MHZ;7;700;10MHZ;7;BAND 14;10MHZ;7;LAA;5MHZ;9;1900;15MHZ,
2;AWS;10MHZ;3;WCS;10MHZ;7;700;10MHZ;7;BAND 14;10MHZ;7;LAA;5MHZ;9;1900;20MHZ]
and morphology = Rural
Condition2:
CELLINFO_LABEL=[5G_MB_COLO_INTRALTE_LB, 5G_MMW_FN, 5G_MMW_INTERLTE_LB, 5G_MMW_INTERLTE_MB, 5G_MMW_INTRALTE, NETB14]
And SNR= Low

220

LNCEL_FDD:DLRSBOOST|700|1000 Increase_acc: 0.9230769230769231 NoImpact: 0.9605263157894737
Condition 1:
[[DLMIMOMODE_LABEL=CLOSEDLOOPMIMO2X2 ^ enbType_LABEL= MACRO ^ morphology_LABEL=RURAL]
Condition 2:
[INTRAF_HO_LABEL=LOW_INTRAF_HO ^ UL_PRB_LABEL= VERYHIGH_UL_PRB]
Condition 3:
[RSRP_LABEL= VERYLOW_RSRP ^ carrierType_LABEL= 2;AWS;15MHZ;3;WCS;10MHZ;3;WCS;10MHZ;7;BAND 14;10MHZ;8;850;5MHZ;9;1900;5MHZ]]

230

| Y | Beta | X1 morphology | X2 frequency | X3 hardware | X4 group number |
|---|---|---|---|---|---|
| improvement | **** | urban | **** | **** | G1 |
| no improvement | **** | **** | **** | **** | G2 |
| improvement | **** | **** | **** | **** | G1 |
| no improvement | **** | **** | **** | **** | G2 |
| no improvement | **** | **** | **** | **** | G3 |
| improvement | **** | **** | **** | H1 | G2 |

240

| | Accuracy | Avg. NPI Improvement |
|---|---|---|
| G1 | 80% | 0.10% |
| G2 | 70% | 10% |
| G1+G2 | 95% | 0.10% |
| G3 | 90% | 3% |

FIG. 2

PERFORMANCE-DRIVEN NETWORK PARAMETER CHANGES IN A COMMUNICATION NETWORK

The present disclosure relates generally to cellular networks, and more particularly to apparatuses, non-transitory computer-readable media, and methods for applying at least one network parameter change group to at least one aspect of a communication network based upon a decision output of at least one classifier trained using a data set comprising at least a first record of a network parameter change that is updated with at least two replacement records based upon at least a second record.

BACKGROUND

Network operators add carriers in cellular networks in order to support the increasing demand in voice and data traffic and to provide high quality of service to the users. Addition of new carriers may require the network operator to accurately configure the carrier parameters for desired performance. This may be challenging because of the large number of parameters related to user mobility, interference, load balancing, and handover management, and their heterogeneous need to configure different values across different locations to handle user and traffic behaviors and different signal propagation patterns.

SUMMARY

In one example, the present disclosure discloses an apparatus, computer-readable medium, and method for applying at least one network parameter change group to at least one aspect of a communication network based upon a decision output of at least one classifier trained using a data set comprising at least a first record of a network parameter change that is updated with at least two replacement records based upon at least a second record. For example, a processing system having at least one processor may obtain a data set comprising a plurality of records of network parameter changes in at least a portion of a communication network. Each record of the plurality of records may include: at least one network parameter change occurring in a time period, at least one attribute associated with at least a first respective aspect of the communication network to which the at least one network parameter change is applied, and a corresponding network performance indicator change for the time period. In addition, at least a first record of the plurality of records may include a plurality of network parameter changes in a plurality of network parameter change groups, where each network parameter change group of the plurality of network parameter change groups includes at least one network parameter change. The processing system may next perform a de-confusion process on at least a portion of the data set. The de-confusion process may include identifying at least a second record of the plurality of records comprising a single network parameter change group of the plurality of network parameter change groups and a corresponding network performance indicator change of the at least the second record, and determining that the corresponding network performance indicator change of the at least the second record is different from the corresponding network performance indicator change of the at least the first record. The de-confusion process may further include updating the data set to replace the at least the first record with at least two replacement records, where at least a first of the at least two replacement records indicates: the single network parameter change group and the corresponding network parameter change of the at least the second record, and where at least a second of the at least two replacement records indicates: at least a second network parameter change group of the plurality of network parameter change groups and the corresponding network performance indicator change of the at least the first record. The processing system may then apply at least one of the plurality of network parameter change groups to at least one second aspect of the communication network based upon at least one decision output of at least one classifier that is trained using the data set that is updated, where the at least one classifier is configured to output a respective decision output based upon one or more input attributes associated with the at least one second aspect of the communication network.

BRIEF DESCRIPTION OF THE DRAWINGS

The teachings of the present disclosure can be readily understood by considering the following detailed description in conjunction with the accompanying drawings, in which:

FIG. 2 illustrates an example rule sets learned for a network parameter change using a RIPPER algorithm, an example data set that may be used for training a plurality of classifiers, e.g., for network parameter change groups in accordance with the present disclosure, and an example table of accuracy and average network performance indicator improvements for example classifiers;

To facilitate understanding, similar reference numerals have been used, where possible, to designate elements that are common to the figures.

DETAILED DESCRIPTION

Figure 1:
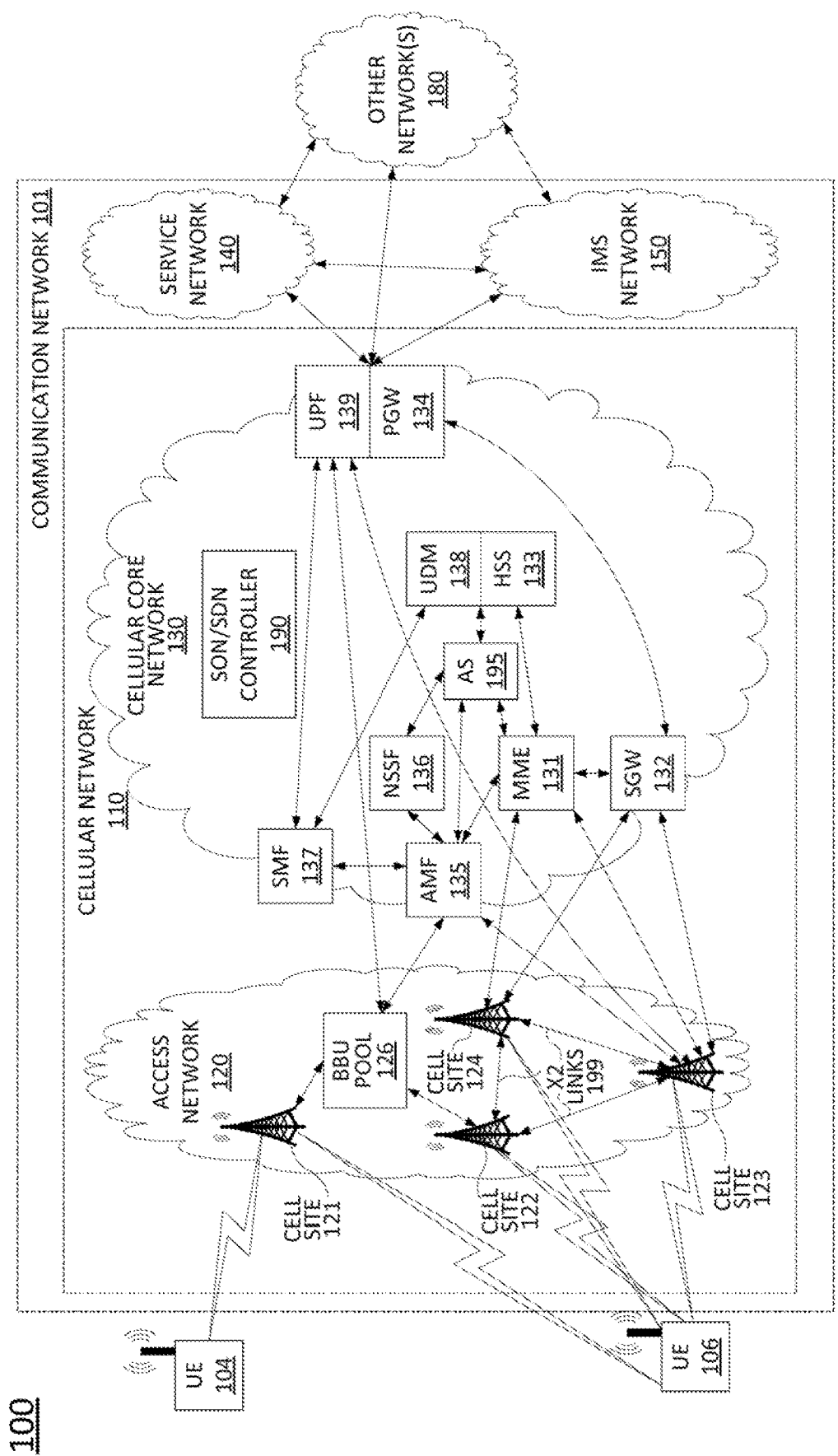
FIG. 1 illustrates a block diagram of an example system, in accordance with the present disclosure.

The present disclosure broadly discloses apparatuses, computer-readable media, and methods for generating and applying at least one network parameter change group to at least one aspect of a communication network based upon a decision output of at least one classifier trained using a data set comprising at least a first record of a network parameter change that is updated with at least two replacement records based upon at least a second record. In particular, examples of the present disclosure provide a data-driven machine learning solution to determine network parameter configuration changes in a communication network. Selecting the network parameter configurations, or settings, that provide optimal performance may be challenging due to the large number of configurable network parameters, complex dependencies across layers and network topology, dynamic user behaviors and traffic patterns, and other factors. In one example, the present disclosure derives optimal settings from exploration of existing configurations in the communication network. In one example, this may include discovering similarity across parameter changes and aspects of the communication network (e.g., network elements, such as base stations, cell sectors, etc., and/or carriers) based on network performance impacts and then using knowledge of the network performance impact (e.g., positive, negative, or neutral/no change) to determine similar configuration changes to be applied across similar aspects of the communication network (e.g., other cells/base stations, cell sectors, carriers, or the like).

To further illustrate, given the large number of configurable network parameters, examples of the present disclosure may discover the network parameter configurations/setting that provides the best service performance experience, which may be quantified by a network performance indicator/metric. In an example of a cellular network, network parameters may comprise configurable settings relating to: layer management (balancing traffic across different cellular frequencies), handover optimization, interference management, outage restoration, coverage and capacity management, and so forth. In addition, examples of the present disclosure may identify similarity among aspects of the communication network based upon various fixed or variable attributes. For instance, given the outdoor nature of the cellular network and the diverse radio channel footprint, fixed attributes may include morphology (e.g., urban, sub-urban, rural, or the like), equipment type (e.g., a particular make or model of antenna array), and so forth. Variable attributes may include: seasonal changes, user densities, mobility patterns, events, and diverse traffic demands.

Traditionally, network engineers may tune the configuration differently across different geographical locations in order to optimize service performance. For instance, traffic patterns across different times of day or year (e.g., a seasonal ski resort demand during winter) may involve network engineers specially adjusting parameters to deal with increased load on the network. The large number of configurable network parameters and the complex dependencies between the network parameter settings provide a challenge for network engineers to discover optimal parameter tuning, leveraging their domain knowledge and vast experience. However, this knowledge may be highly distributed across engineers and may be difficult to capture and to share network-wide. For instance, in large operational environments, it may be common to discuss and document findings of best practices via in-person or online forums. For example, new configuration settings may be introduced by experiment in one part of the network, and based on performance enhancements, decisions are made whether to introduce the same or similar network parameter changes in the rest of the network. This practice works well for certain types of configurable network parameters that change infrequently, which may be referred to as global parameters. For instance, in general, the values for the global configuration parameters may be more or less uniform across the network. However, there may still be a large number of local network parameters that may be changed more frequently, e.g., based on the previously discussed attributes. Unfortunately, given the large variation and magnitude of the changes for local network parameters, it may become substantially more difficult to systematically document findings across different parts of the network, and to then detect commonalities in attributes and implement the same or similar changes across the whole network. In one example, the present disclosure may address these local network parameters and may learn how to optimally tune such network parameters (e.g., to select the appropriate settings) to improve service performance. However, the examples of the present disclosure may be applied to any configurable network parameters, regardless of any particular categorization (e.g., such as "global" versus "local" configurable network parameters).

Self-optimizing/self-organizing networks (SONs) include resources and logic to automate network configuration, and to provide self-optimization and self-healing. For instance, a SON orchestrator may tune network parameters (e.g., the configurations/settings thereof) in response to changing network conditions, such as outages and congestion. Examples of the present disclosure may generate automated rules/logic for a SON orchestrator or the like to implement network parameter changes derived from network-wide records. Notably, this provides a holistic view and further addresses sparsity challenges that may otherwise be faced when relying on only local knowledge.

For instance, the present examples derive knowledge by mining data and exploring the relationship between existing configurations and/or network parameter changes and corresponding service performance impacts (e.g., positive change, negative change, no impact, etc.). In one example, the present disclosure applies a multi-phased approach to first accurately detect and associate the performance improvements to network parameter changes, and to then isolate the propagation of the same or similar network parameter changes to aspects of the network with similar attributes. For instance, this may include the application of network parameter changes that is/are successful for cells, sectors, and/or carriers with certain attributes to other cells, sectors, and/or carriers having the same or similar attributes, such as: morphology, traffic characteristics, equipment type, etc. It should also be noted that in one example, propagation of network parameter changes may be to cells, sectors, and/or carriers having the same or similar attributes that are identified as being relevant to the network performance improvement(s) observed for the corresponding network performance indicator change(s). For instance, an improvement in network performance for increased transmit power (e.g., to power level "X") may be found in "rural" cells, but there may be a decrease for "urban" cells. However, the antenna type may have no impact on whether the network performance indicator change is expected to be positive or negative.

Using real-world data over multiple months, it is observed that manual and/or SON implemented configuration changes may occur frequently. In this regard, co-occurrence of multiple network parameter changes in the same time period (e.g., on the same day) may increase the difficulty in identifying the causes of network performance changes, thereby resulting in impact confusion. In one example, the present disclosure may first organize high repetition, co-occurring network parameter changes (e.g., network parameter changes that always or typically occur together in a time period) into a network parameter change group. For instance, the network parameter changes that have high co-occurrence may be deemed highly likely to have a joint impact on service performance. In one example, the present disclosure may apply a threshold to a similarly metric based on co-occurrence to cluster configuration parameter changes. For instance, in one example, this may comprise a Jaccard similarly metric. In addition, in one example, the threshold may be 90 percent, 85 percent, or the like. In one example, network parameter changes organized into network parameter change groups may help in reducing the impact confusion.

In one example, the present disclosure may further utilize study locations (e.g., locations with changes) versus control locations (e.g., locations without changes) for robust impact assessment, and to eliminate the effect of external factors such as seasonal changes, traffic shifts, or core network changes. To further reduce the impact confusion, examples of the present disclosure may also compare the performance impacts of multiple network parameter change groups that may co-occur in the network. For example, if network parameter change groups A and B co-occur at one network location in a given time period (e.g., on the same day) with a resulting network performance improvement, then the present disclosure may identify whether network parameter change groups A and B individually at other network locations have resulted in improvements (or not). Thus, by comparing the impacts of (A&B), (A&~B), and/or (~A&B), for instance, examples of the present disclosure may reduce the confusion of network performance impacts and more accurately label if the performance improvement is because of A or B, or both A and B. Such a process may be referred to herein as "de-confusion." In one example, records/samples in a data set that may be used to train a plurality of classifiers associated with a plurality of network parameter change groups may be updated/replaced based upon the de-confusion process. For instance, a first record that indicates network parameter change groups A and B and a corresponding network performance indicator impact may be replaced by two records that indicate the inferred impacts of A and B separately, e.g., when it is inferred from other records that the observed impact is due to A alone or B alone. However, in another case, the first record may be left as-is, e.g., when it is inferred from other records that the impact is due to A and B together.

In one example, an updated data set (e.g., where a de-confusion process has been applied to the records therein and one or more changes have been made accordingly) may be used to train one or more classifiers associated with a plurality of network parameter change groups. For instance, the classifiers may be trained to identify, based on various attributes, aspects of the network where network performance improvements are expected from implementing network parameter changes of respective network parameter change groups. For example, an input vector comprising attributes of a carrier, sector, cell site, etc. may be input to a classifier, and a corresponding output value generated via the classifier (e.g., a score) may indicate whether the network parameter changes of the associated network parameter change group should be implemented for the carrier, sector, cell site, etc. In one example, the present disclosure may automatically apply the network parameter changes of the associated network parameter change group, e.g., in response to determining that the output value/score exceeds a threshold. To illustrate, metropolitan cities might experience improvement with a certain network parameter configuration/setting, but the same setting can result in a degradation in rural locations.

In one example, the present disclosure may consider a large set of network attributes based on configuration and user load, mobility, RF condition and user distance to help with the impact localization. In one example, each classifier may comprise a rule learner, or rule learning algorithm, such as a decision tree, an incremental reduced error pruning classifier, or a repeated incremental pruning to produce error reduction (RIPPER) classifier. As such, each classifier may accurately identify the most important attributes (k out of N) that maximizes the changes of network performance improvement. Based on the rules of a given classifier, examples of the present disclosure may then automatically implement (e.g., via a SON orchestrator or the like) and/or recommend network parameter changes of the associated network parameter change group to aspects of the network with attributes matching the rules. In one example, multiple classifiers may cause the implementation of multiple network parameter change groups.

Examples of the present disclosure thus benefit from searching through a large number of configurable network parameters. In addition, using the performance impacts of the configuration changes may generate network parameter changes/settings that may result in optimal performance and/or performance improvement. Traditional solutions may fail to effectively search through the whole space, resulting in a sub-optimal configuration setting across the network. In addition, automated solutions that focus on learning with respect to individual network elements may also fail to leverage knowledge that may be found globally across the network. In contrast, the present examples using network-wide records may determine more optimal configuration settings for improving network performance, and may also converge to such settings/configurations more quickly.

Attributes of a carrier, the base station/cell, and/or the sector at which a carrier is deployed may include: vendor, carrier frequency, carrier type (e.g., FirstNet, NB-Iot), carrier number, channel bandwidth, hardware version (e.g., remote radio head (RRH) type, or the like), software version, cell/base station location, a base station demographic characteristic/morphology (e.g., urban, suburban, rural, etc.), available downlink multiple input-multiple output (MIMO) modes, and other carrier and/or base station/cell site information. It should be noted that there may be hundreds of configurable network parameters (which may also be referred to as "configuration parameters") per carrier that may be automatically tuned in accordance with the present disclosure. For illustrative purposes, several parameters are outlined in further detail herein. For instance, a first configuration parameters may comprise "a3Offset" (an LTE base transceiver station (BTS) Cell Radio Network (RNW) (LNCEL) parameter), which may represent a handover margin for better cell handover (HO). This configuration parameter may be used in measurement event type A3 where the event is triggered when the neighbor cell becomes better than the serving cell by the value of the A3 offset. This parameter is used for both reference signal received power (RSRP) and reference signal received quality (RSRQ)-based A3 measurement for intra-frequency HO measurements.

A second configuration parameter "actInterFreqLB" (another LNCEL parameter) may comprise an indicator of an activation status of inter-frequency load balancing (iFLB) feature. If the feature iFLB is activated ("true"), inter-frequency load measurements are performed per cell. Dependent on the actual load situation, endpoint devices, or user equipment (UEs), might be handovered to lesser loaded neighbor cells (e.g., different frequency layer). A third configuration parameter "dlInterferenceEnable" (another LNCEL parameter) may indicate an enable status of downlink interference generation. A fourth configuration parameter "cacHeadroom" (an active mode load equalization parameter (AMLEPR)) may comprise an active mode load equalization feature in which a certain target cell shall leave the "active state," if the reported call admission control (CAC) value from this target cell is smaller than the CAC headroom for the target cells frequency layer. A fifth configuration parameter "sFreqPrio" may be used in a comparison between two candidate SCells. This comparison is based on a measure of the average load in uplink, and can be biased towards a cell by giving it a higher priority. It is also used in the relative comparison to pFreqPrio in a primary cell (PCell) swap algorithm (e.g., sFreqPrio=1 (default) for highest priority, sFreqPrio=10000 for lowest priority). To prioritize unlicensed against licensed cells, their sFreqPrio values may be set at least one decade apart (e.g., [1-10] vs. [100-10000]).

A sixth configuration parameter "actPdcchLoadGen" (an LNCEL frequency division duplex (LNCEL_FDD) parameter) may comprise an activation status of physical downlink control channel (PDCCH) load generation. A seventh configuration parameter "pdcchLoadLevel" (another LNCEL_FDD parameter) may define a load level representing the percentage of used PDCCH control channel elements (CCEs) on all available PDCCH CCEs. Used PDCCH CCEs include all CCEs of common search space (CSS)/UE-specific search space (USS) and dummy PDCCHs. This parameter will not restrict normal PDCCH allocation. Only when normal PDCCH load has not reached the level defined by this parameter may dummy PDCCHs be added. This parameter is mandatory when actPdcchLoadGen is set to "true." An eighth configuration parameter "interFrqQThrHighR9" (an inter frequency idle mode (IRFIM) parameter) specifies an inter-frequency quality threshold used by a UE when reselecting towards a higher priority frequency than the currently serving frequency.

A ninth parameter "a3OffsetRsrpInterFreqQci1" (a handover parameters to neighboring interfrequency LTE cell (LNHOIF) parameter) may comprise an A3 offset RSRP inter-frequency during QCI1 handover margin for better cell handover when a UE has a QCI1 bearer. For instance, the RSRP offset value may be used as an EUTRA measurement report triggering condition for event A3 when the UE has a QCI1 bearer. The event is triggered when the neighbor cell becomes better in RSRP than the serving cell by at least the A3 offset. In one example, the information element (IE) value is multiplied by 2. A tenth parameter "thresholdRsrpI-FLBFilter" (another LNHOIF parameter) may comprise an inter-frequency load balancing threshold for RSRP target filtering. For instance, this threshold may be for filtering target cells out of reported A4 event based on RSRP values due to inter-frequency load balancing. It should be noted that this parameter is aimed for postprocessing the related A4 report and is not for any report configuration in the UE. An eleventh parameter "hysB2ThresholdUtra" (a handover parameters to neighboring WCDMA cell (LNHOW) parameter) may comprise related hysteresis thresholds B2Th1, B2Th2 HO WCDMA and related hysteresis of handover margin for HO to WCDMA. This parameter may be used within the entry and leave condition of the B2 triggered reporting condition. In one example, the IE value is multiplied by 2. A twelfth parameter "qrxlevmin" (a system information block (SIB) cell access related parameter) may specify a minimum RSRP receive level in cell. A thirteenth parameter, "threshSrvLow" (another SIB parameter) may specify a (low) threshold for the serving frequency used in reselection evaluation towards lower priority EUTRAN frequency or RAT. It should again be noted that the foregoing are just a small sample of numerous possible configuration parameters that may be addressed in accordance with the present disclosure. These and other aspects of the present disclosure are discussed in greater detail below in connection with the examples of FIGS. 1-4.

FIG. 1 illustrates an example network, or system 100 in which examples of the present disclosure may operate. In one example, the system 100 includes a communication network 101, e.g., a communication service provider network. The communication network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the communication network 101.

In one example, the cellular network 110 comprises an access network 120 and a cellular core network 130. In one example, the access network 120 comprises a cloud radio access network (RAN). For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In accordance with the present disclosure, any one or more of cell sites 121-123 may be deployed with antenna and radio infrastructures, including multiple input multiple output (MIMO) and millimeter wave antennas.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

As illustrated in FIG. 1, cell sites, or base stations (e.g., cell sites 122-124), may be connected to each other via X2 links 199. X2 links may be implemented via physical links, e.g., fiber connections, wireless base station-to-base station links, or virtual links. For instance, with respect to virtual links, in the example of FIG. 1, cell site 121 and cell site 122 may comprise base stations that are implemented at least partially on shared hardware (e.g., BBU pool 126) such that no external physical or wireless link is used. Similarly, to the extent that 5G and LTE infrastructure may be implemented at the same cell site/base station, an X2 interface may similarly be virtual in nature, or may comprise a short physical connection between two sets of co-located base station equipment.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IOT), and machine-type communication (MTC), a second network slice may be used for streaming video services, a third network slice may be utilized for voice calling, a fourth network slice may be used for gaming services, a fifth network slice may be dedicated first responder services, governmental services, or the like, and so forth.

In one example, SMF 137 may perform endpoint device IP address management, UPF selection, UPF configuration for endpoint device traffic routing to an external packet data network (PDN), charging data collection, quality of service (QOS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, communication network 101 may provide a cloud storage service, web server hosting, and other services. As such, service network 140 may represent aspects of communication network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

Figure 4:
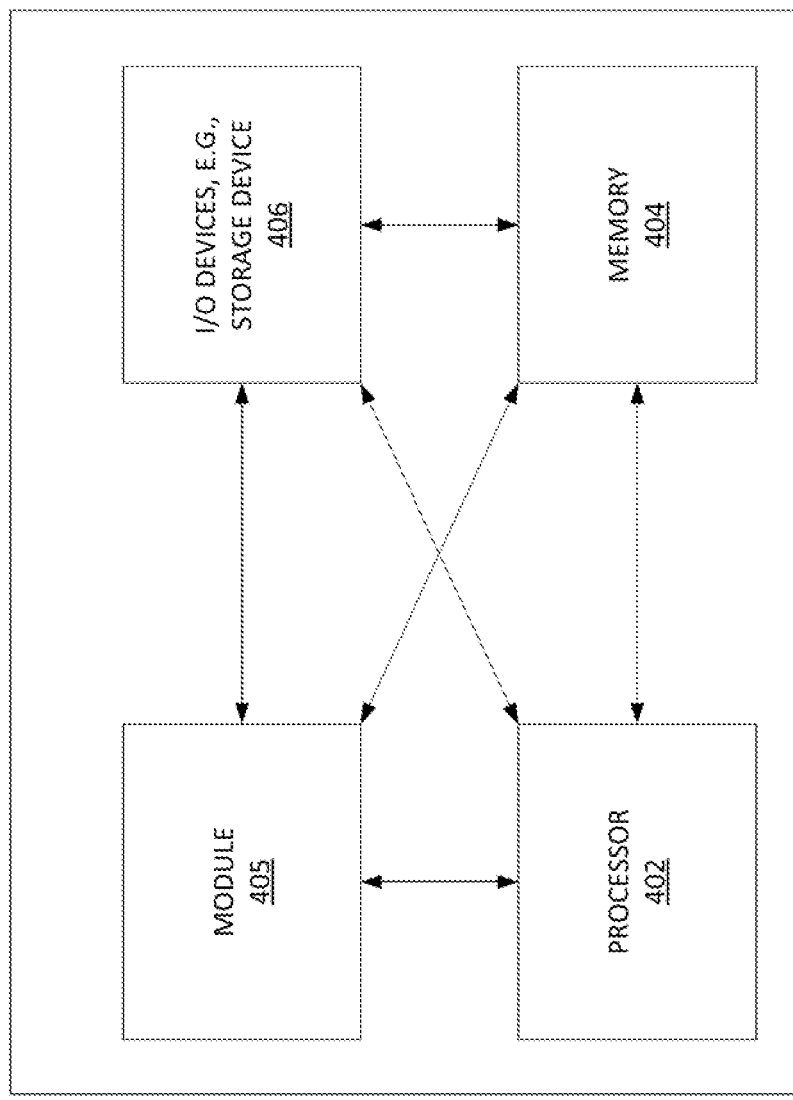
FIG. 4 illustrates a high level block diagram of a computing device specifically programmed to perform the steps, functions, blocks and/or operations described herein.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. In accordance with the present disclosure, SON/SDN controller 190 may comprise all or a portion of a computing system, such as computing system 400 as depicted in FIG. 4, and may be configured to provide one or more functions in connection with examples of the present disclosure for applying at least one network parameter change group to at least one aspect of a communication network based upon a decision output of at least one classifier trained using a data set comprising at least a first record of a network parameter change that is updated with at least two replacement records based upon at least a second record. For instance, SON/SDN controller 190 may activate and deactivate antennas/remote radio heads of cell sites 121 and 122, respectively, may steer antennas/remote radio heads of cell sites 121 and 122 (e.g., adjusting vertical tilt angles, azimuth bearings, beamwidths, power levels, and or other settings), may allocate or deallocate (or activate or deactivate) baseband units in BBU pool 126, may add (or remove) one or more network slices, and may perform other operations for adjusting configurations of components of cellular network 110 in accordance with the present disclosure.

In accordance with the present disclosure, SON/SDN controller 190 may adjust various configurable network parameters (e.g., the settings thereof) for base stations/cells, sectors, and/or carriers in operation and/or to be deployed at the various cell sites 121-124 of the cellular network 110. While there may be hundreds of network parameters per carrier (and/or per cell or sector), a few are described herein by way of example, such as those noted above, e.g., a handover margin, an inter-frequency load balancing activation status, a downlink interference generation enable status, an active mode load equalization enable status, an average uplink load biasing parameter for secondary cell selection, an inter-cell load generation for physical downlink control channel enable status, a physical downlink control channel load level parameter, an inter-frequency quality threshold for reselecting a higher priority frequency, a reference signal received power inter-frequency handover margin for handover to a neighboring base station, an inter-frequency load balancing threshold for reference signal received power target cell filtering, a hysteresis threshold for a handover margin for handover to wideband code division multiple access, a minimum transmit reference signal received power level in a cell, a reselection threshold for evaluating a lower priority frequency or a lower priority radio access technology, and so forth.

Figure 3:
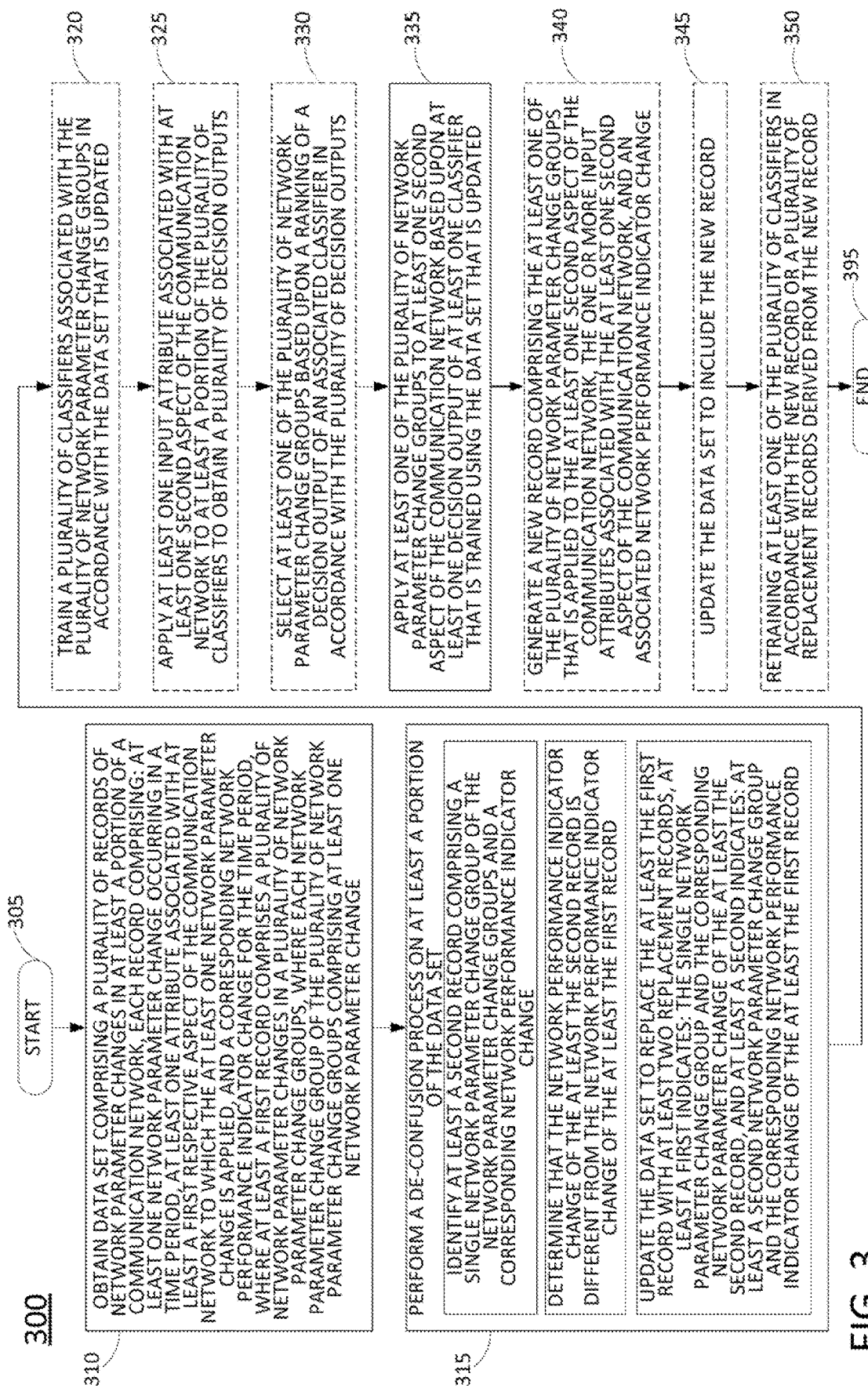
FIG. 3 illustrates a flowchart of an example method for applying at least one network parameter change group to at least one aspect of a communication network based upon a decision output of at least one classifier trained using a data set comprising at least a first record of a network parameter change that is updated with at least two replacement records based upon at least a second record.

For instance, SON/SDN controller 190 may be configured to perform one or more operations in accordance with the example method 300 of FIG. 3. For example, SON/SDN controller 190 may determine network parameter changes to be applied for existing base stations/cells, sectors, and/or carriers, at cell sites 121-124, or for new carriers to be added at cell sites 121-124, and may implement these network parameter changes and/or settings, e.g., via instructions to cell sites 121-124 and/or BBU pool 126. In one example, SON/SDN controller 190 may also configure and reconfigure other components of cellular network 110 in response thereto, such as activating remote radio heads (RRHs) and/or BBU pools to provide additional active base stations or sectors (e.g., where such physical components are already deployed and installed, but are inactive), instructing base stations/RRHs to adjust vertical tilt angles, azimuth bearings, beamwidths, power levels, and or other settings, adding (or removing) one or more network slices, and so on.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, SON/SDN controller 190 may further comprise a SDN controller that is responsible for instantiating, configuring, managing, and releasing VNFs. For example, in a SDN architecture, an SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of the UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive multi-path and/or spatial diversity signals. Each of the UE 104 and UE 106 may also include a gyroscope and compass to determine orientation(s), a global positioning system (GPS) receiver for determining a location (e.g., in latitude and longitude, or the like), and so forth. In one example, each of the UE 104 and UE 106 may include a built-in/embedded barometer from which measurements may be taken and from which an altitude or elevation of the respective endpoint device may be determined. In one example, each of the UE 104 and UE 106 may also be configured to determine location/position from near field communication (NFC) technologies, such as Wi-Fi direct and/or other IEEE 802.11 communications or sensing (e.g., in relation to beacons or reference points in an environment), IEEE 802.15 based communications or sensing (e.g., "Bluetooth", "ZigBee", etc.), and so forth.

As illustrated in FIG. 1, UE 104 may access wireless services via the cell site 121 (e.g., NR alone, where cell site 121 comprises a gNB), while UE 106 may access wireless services via any of cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via multiple gNBs (e.g., cell sites 121 and 122 and/or cell sites 121 and 122 in conjunction with BBU pool 126). In another example, UE 106 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for dual connectivity, as described herein. Furthermore, either or both of the NR/5G and or EPC (4G/LTE) core network components may manage the communications between UE 106 and the cellular network 110) via cell site 122 and cell site 124.

In one example, UE 106 may also utilize different antenna arrays for 4G/LTE and 5G/NR, respectively. For instance, 5G antenna arrays may be arranged for beamforming in a frequency band designated for 5G high data rate communications. For instance, the antenna array for 5G may be designed for operation in a frequency band greater than 5 GHZ. In one example, the array for 5G may be designed for operation in a frequency band greater than 20 GHz. In contrast, an antenna array for 4G may be designed for operation in a frequency band less than 5 GHZ, e.g., 500 MHz to 3 GHZ. In addition, in one example, the 4G antenna array (and/or the RF or baseband processing components associated therewith) may not be configured for and/or be capable of beamforming. Accordingly, in one example, UE 106 may turn off a 4G/LTE radio, and may activate a 5G radio to send a request to activate a 5G session to cell site 122 (e.g., when it is chosen to operate in a non-DC mode or an intra-RAT dual connectivity mode), or may maintain both radios in an active state for multi-radio (MR) dual connectivity (MR-DC).

In one example, the cellular core network 130 further includes an application server (AS) 195. For instance, AS 195 may comprise all or a portion of a computing system, such as computing system 400 as depicted in FIG. 4, and may be configured to perform operations for applying at least one network parameter change group to at least one aspect of a communication network based upon a decision output of at least one classifier trained using a data set comprising at least a first record of a network parameter change that is updated with at least two replacement records based upon at least a second record (e.g., in accordance with the example of FIG. 3). For example, AS 195 may perform such operations as an alternative to, or in addition to SON/SDN controller 190. In one example, AS 195 may perform various operations of FIG. 3 and may provide results/recommendations to SON/SDN controller 190. For instance, AS 195 may perform operations that include collecting a data set comprising records of network parameter changes, identifying network parameter change groups, applying a de-confusion process with respect to various records, training a plurality of classifiers in accordance with an updated data set, applying attributes of additional aspects of the communication network to one or more trained classifier(s), selecting one or more network parameter change groups to apply based upon the output(s) of the one or more classifiers, and so forth. SON/SDN controller 190 may then be tasked with activating new carriers and/or implementing the determined network parameter changes/settings for new or existing carriers, or for a base station/cell, a sector, etc. (e.g., in addition to other responsibilities of SON/SDN controller 190). For example, AS 195 may instruct and/or may provide recommendations for various network parameter changes/settings to SON/SDN controller 190. In this regard, it should be noted that in one example, AS 195 may be further split into two components which may comprise physically separate hardware: a training/testing component (e.g., to train and/or test the classifiers with labeled training and/or testing data comprising an updated data set comprising records of network parameter changes) and a deployment component (e.g., for applying input vectors comprising attributes associated with aspects of the communication network 101 to one or more classifiers, and to transmit recommendations or instructions to SON/SDN controller 190 based upon the output(s) of the classifier(s)).

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. Thus, these and other modifications are all contemplated within the scope of the present disclosure.

As noted above, the present disclosure quantifies the impact of network parameter changes using a network performance indicator metric and/or changes thereto. In one example, the network performance indicator may comprise a composite quality index (CQI), which may be based upon/calculated from a plurality of sub-metrics (e.g., component network performance indicators, or "key performance indicators" (KPIs)), which may include a data session drop rate, a data access failure rate, a throughput metric, a reference signal received power (RSRP) metric, a reference signal received quality (RSRQ) metric, a channel quality index (e.g., per carrier, per sector, and/or per cell), and so forth. In one example, CQI may be in accordance with:

$$CQI = \sum_{n=0}^{N} W_n e^{K_n E_n} \quad \text{Equation 1}$$

In Equation 1, N is the number of component KPIs, $W_n$ is a respective weight of the $n^{th}$ component KPI, $K_n$ is a raw score for the $n^{th}$ component KPI, and $E_n$ is an exponential constant associated with the $n^{th}$ component KPI.

Notably, individual KPIs may be improved by one or more network parameter changes, but the overall CQI may be reduced. Accordingly, in one example, the present disclosure may track a network performance indicator of a CQI. In one example, since the balancing of KPIs (optimizing the CQI) is considered, a single data record may be associated with all of the network parameter changes that may be applied to an aspect of the communication network (e.g., a cell, sector, and/or carrier) on a given day (or other selected time periods, such as a 12 hour period, a 48 hour period, etc.). Thus, a given record may indicate one or more network parameter changes that occur in such time period.

As noted above, in one example, a de-confusion process may be applied to various records in the data set. In one example, the present disclosure may scan records within a time window that spans before and after a time period associated with a given record. For instance, a plurality of network parameter changes of a plurality of network parameter change groups may be applied at a base station on November $20^{th}$ and an improvement in the CQI may be observed. However, it is not clear if the improvement is due to one of the network parameter change groups alone, or a combination thereof (or sub-combination, where three or more network parameter change groups are applied). As such, the de-confusion process may search the data set for records relating to the other cells in the communication network where individual network parameter change groups of the plurality of network parameter change groups (or sub-combinations of the plurality of network parameter change groups) were applied (and for which the network performance impact was recorded). In one example, the time window for consideration of such records may be 9 days, e.g., from four days before the day associated with the subject record to four days after. In other examples, a different time window may be used, such as 7 days, 11 days, etc. In addition, in other examples, the time window may not be centered on the subject day or other time period. For instance, records from 5 days before and up to 3 days after the time period of the subject record may be searched. It is noted that in many instances, network parameter changes occur on or around the same day in adjacent network zones/regions (e.g., uptown New York City and downtown New York City), but this does not necessarily apply when considering distant network zones/region (e.g., California and Maryland).

In one example, a network parameter change may be defined as a tuple of: [parameter| new value| old value| carrier frequency]. For instance, an example for a carrier level change is: [LNHOIF:3OFFSETRSRPINTERFREQ| 30| 3| 2100]. An example for a cell level change is: [LNCEL: PMAX| 360| 270| NaN] (where NaN mean not applicable/ none).

As noted above, in one example, network parameter changes may be grouped based upon frequent co-occurrences according to a similarity metric and a threshold, e.g., 90% for a Jaccard similarity metric, or the like (e.g., Simpson, Sorenson-Dice, etc. a Levenshtein distance, a Euclidean distance, a Manhattan distance, cosine similarity, and so forth). For instance, a Jaccard similarity metric for network parameter changes "A" and "B": may be calculated in accordance with:

$$J(A, B) = \frac{|A \cap B|}{|A \cup B|} = \frac{|A \cap B|}{|A| + |B| - |A \cap B|} \quad \text{Equation 2}$$

For instance, in an illustrative example, a number of network parameter changes may be observed at a cell on the same day along with an improvement in the network performance indicator. An example record may be [A, B, C, D, E, F| improvement| confusion], where A-F are respective network parameter changes. In one example, the network parameter changes may first be grouped based on frequent co-occurrences, e.g., Jaccard similarity. For example, based upon calculations of J(A, B), J(A, C), J(A, D), J(A, E), J(A, F) in the data set, it may be observed that J(A, B) and J(A,F)>0.9. As such, [A, B, F] may comprise a network parameter change group. The remaining ungrouped are [C, D, E]. Based upon J(C,D) and J(C,E) it may be calculated that C is isolated. Thus, C may be in a group by itself. Next, a calculation based on the data set may result in discovering that J(D,E)>0.9. Thus, [D, E] may be set as another group. The result is three network parameter change groups in a record G=[[A, B, F], [C], [D,E] | improvement| confusion]. If length(G)>1, then the record may be labeled "confusion," since the causality of an observed corresponding network performance indicator change may be unclear. Otherwise, the record may be labeled "no confusion" and may be directly used, e.g., for classifier training. In one example, it is observed that G does not or very rarely exceeds length (G)=4.

As noted above, the present disclosure may then apply a de-confusion process using other records in the data set. For example, one or more other records may include only the groups [A, B,F] and [C] co-occurring and leading to an improvement in the network performance indicator. However, one or more additional records may include only the group [A, B, F] with a network performance indicator change of "no impact." In this case, it may be concluded, for the record involving [A, B, C, D, E, F| improvement| confusion], that [C] is the casual network parameter change group that resulted in an improved network performance indicator. As such, the data set may be updated to replace the record involving [A, B, C, D, E, F] with two or more replacement records. For instance [A, B, C, D, E, F| improvement| confusion] may be replaced with: [C| improvement| no confusion], [A,B,F| no improvement| no confusion], [D,E| no improvement| no confusion].

In one example, over a six month period, slightly more than half of the records may be labeled as "no confusion." It is also observed than less than 5 percent of the records indicated an increase in the network performance indicator, while slightly more records indicate a decrease in the network performance indicator. In other words, most records indicate "no change" and are associated with no apparent impact on the network performance indicator. In one example, to further enhance the number of "no confusion" samples in the data set, additional records may be added as follows. For a record with a single network parameter change of [X| improvement| no confusion], where X=[parameter| new value| old value| carrier frequency], another record of [X' | decrease| no confusion] may be added, where X'=[parameter| old value| new value| carrier frequency]. Similar additional records may be added for records with single network parameter change group with the inverses of multiple network parameter changes in a group.

In one example, different classifiers associated with different network parameter change groups may be trained separately. As noted above, each classifier may comprise a rule learner, or rule learning algorithm, such as a decision tree, an incremental reduced error pruning classifier, or a repeated incremental pruning to produce error reduction (RIPPER) classifier. As such, each classifier may accurately identify the most important attributes (k out of N) that maximizes the changes of network performance improvement. For example, each classifier may be associated with a network parameter change group and may be trained to classify/predict, for a given aspect of the communication network based on the attributes thereof, whether an application of the network parameter change group is expected to result in an improvement of the network performance indicator (or not). In one example, records in the data set may be appended with corresponding attributes of an aspect of the communication network associated with the record (e.g., cell attributes, sector attributes, and/or carrier attributes).

In one example, the records labeled "no confusion" may be segregated and used for classifier training. However, in another example, the classifier training may use the data set with both "confusion" and "no confusion" records and may result in improved rule learning. For instance, FIG. 2 illustrates a first example rule set 210 learned for the network parameter change [LNCEL_FDD:DLRSBOOST|700| 1000] using a RIPPER algorithm and "no confusion" records relating to the network parameter change, and a second example rule set 220 learned for the network parameter change using the RIPPER algorithm and both "confusion" and "no confusion" records relating to the network parameter change. For instance, in the example of FIG. 2, the accuracy of the classifier/rule set 210 for "increase" is 0.7 and for "no impact" is 0.976. However, the accuracy of the classifier/rule set 220 for "increase" is 0.923 and for "no impact" is 0.96. While there is a slight decrease in "no impact" accuracy, the overall improvement is significant for the "increase" accuracy. It should be noted that "increase" means an example in which the rule set predicts that a network performance indicator improvement would result from application of the corresponding network performance indicator change group. The "increase" accuracy indicates the correctness of such predictions based on subsequent empirical observations after the network parameter change (s) is/are implemented (and likewise for the "no impact" accuracy).

FIG. 2 further illustrates an example data set 230 that may be used for training a plurality of classifiers, e.g., for network parameter change groups G1, G2, G3, etc., and a corresponding table 240 of accuracy and average network performance indicator improvements (e.g., for testing examples, where the network parameter change(s) is/are implemented in accordance with the rule set). It should be noted that in the data set 230, Y is a label of improvement/no improvement and X1-X4 are attributes (where X4 indicates the network parameter change group). It should also be noted that in data set 230, there is an example record indicating that in an aspect of the network (e.g., a given cell) with an attribute of morphology=urban, the application of network parameter change group G1 resulted in an improvement, while another example record indicates that in a different cell with an attribute of hardware=H1, the application of network parameter change group G2 resulted in an improvement. Various other attributes/fields for other records are indicated as ****. It should be understood that these may represent various actual values, but for illustrative purposes are not relevant to be shown. Depending upon the number of samples in the dataset and the accuracy of the classifier rules, it may be the case that more than one rule set/classifier may indicate that a respective network parameter change group should be implemented, e.g., in still another cell where the morphology=urban and hardware=H1 both network parameter change groups G1 and G2 may be recommended. In one example, the present disclosure may select between multiple recommended groups based on overall accuracies of the respective rules/classifiers for "improvement" and/or respective average network performance indicator improvement (e.g., as shown in table 240). In one example, the selection may be based on a weighted combination of both factors.

The example of FIG. 2 further illustrates that the present disclosure may also consider the possibility that enhanced network performance indicator improvement may result from the combination of multiple network parameter change groups. Thus, for example, a classifier may be trained (and hence a rule set derived) for a combination of network parameter change groups G1 and G2. In this case, there is a very high accuracy for "improvement" (95 percent) as shown in table 240. However, there is only a slight network performance indicator improvement (e.g., 0.1 percent). As such, in one example, the present disclosure may forego implementing G1+G2 in combination, in favor of G2 alone, which has lower accuracy, but substantially higher network performance indicator improvements, on average. Thus, these and other modifications are all contemplated within the scope of the present disclosure.

FIG. 3 illustrates a flowchart of an example method 300 for applying at least one network parameter change group to at least one aspect of a communication network based upon a decision output of at least one classifier trained using a data set comprising at least a first record of a network parameter change that is updated with at least two replacement records based upon at least a second record, in accordance with the present disclosure. In one example, steps, functions and/or operations of the method 300 may be performed by a component of system 100 of FIG. 1, e.g., a SON/SDN controller 190, application server 195, and so forth, or by one or more components of the system 100 in conjunction with another component, or components thereof, e.g., application server 195 in conjunction with SON/SDN controller 190, cell sites 121-124, and so forth. In one example, the steps, functions, or operations of method 300 may be performed by a computing device or system 400, and/or a processing system 402 as described in connection with FIG. 4 below. For instance, the computing device or system 400 may represent at least a portion of an application server or controller that is configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or system 400 may collectively function as a processing system. For illustrative purposes, the method 300 is described in greater detail below in connection with an example performed by a processing system. The method 300 begins in step 305 and proceeds to step 310.

At step 310, the processing system obtains a data set comprising a plurality of records of network parameter changes in at least a portion of a communication network. In one example, each record of the plurality of records may comprise: at least one network parameter change occurring in a time period, at least one attribute associated with at least one aspect of the communication network (e.g., at least one "first" aspect of the communication network) to which the at least one network parameter change is applied, and a corresponding network performance indicator change for the time period. In addition, at least a first record of the plurality of records may comprise a plurality of network parameter changes in a plurality of network parameter change groups, e.g., where each network parameter change group of the plurality of network parameter change groups comprises at least one network parameter change, as described above. For instance, in one example, the communication network may comprise a wireless network (e.g., a cellular network), and the at least the first respective aspect of the communication network may comprise a respective: carrier, sector, cell/wireless access point, and so forth.

In various examples, the network parameter changes may be associated with network parameters comprising at least two of: a handover margin, an inter-frequency load balancing activation status, a downlink interference generation enable status, an active mode load equalization enable status, an average uplink load biasing parameter for secondary cell selection, an inter-cell load generation for physical downlink control channel enable status, a physical downlink control channel load level parameter, an inter-frequency quality threshold for reselecting a higher priority frequency, an reference signal received power inter-frequency handover margin for handover to a neighboring base station, an inter-frequency load balancing threshold for reference signal received power target cell filtering, a hysteresis threshold for a handover margin for handover to wideband code division multiple access, a minimum transmit reference signal received power level in a cell, a reselection threshold for evaluating a lower priority frequency or a lower priority radio access technology, and so forth. In addition, the at least one attribute may comprise at least one of: a base station hardware version, a base station software version, a carrier channel frequency, a carrier channel bandwidth, a base station location, a carrier type, a base station demographic characteristic, a downlink multiple input multiple output mode, and so forth.

In one example, network parameter changes of the plurality of network parameter changes may be organized into the plurality of network parameter change groups in accordance with a similarity metric. For instance, two network parameter changes of the plurality of network parameter changes may be included in a same network parameter change group of the plurality of network parameter change groups when the similarity metric exceeds a threshold. As noted above, the threshold may be, for example, 90 percent, 85 percent, etc. for a Jaccard similarity metric, or the like (e.g., Simpson, Sorenson-Dice, etc. a Levenshtein distance, a Euclidean distance, a Manhattan distance, cosine similarity, and so forth). It is again noted that the similarity metric may be based upon co-occurrences of the two network parameter changes from historical records.

In one example, the corresponding network performance indicator change may comprise a change to a composite quality index (CQI) (e.g., comprising a score/value). In addition, in one example, the CQI may comprise a composite metric that is based upon at least two of: a data session drop rate, a data access failure rate, a throughput metric, a reference signal received power metric, a reference signal received quality metric, or a channel quality index (e.g., an average RSRP, RSRQ, and/or CQI on a carrier, per sector, and/or per cell), and so forth within a measurement time period (e.g., a day or another time period such as 12 hours, 48 hours, etc.).

At step 315, the processing system performs a de-confusion process on at least a portion of the data set. For instance, the de-confusion process may include identifying at least a second record of the plurality of records comprising a single network parameter change group of the plurality of network parameter change groups and a corresponding network performance indicator change of the at least the second record, and determining that the corresponding network performance indicator change of the at least the second record is different from the corresponding network performance indicator change of the at least the first record. In such case, the de-confusion process may further include updating the data set to replace the at least the first record with at least two replacement records. For instance, at least a first of the at least two replacement records may indicate: the single network parameter change group and the corresponding network parameter change of the at least the second record (as well as the attributes of the at least the first respective aspect of the communication network). In addition, at least a second of the at least two replacement records may indicate: at least a second network parameter change group of the plurality of network parameter change groups and the corresponding network performance indicator change of the at least the first record (as well as the attributes of the at least the first respective aspect of the communication network). It should be noted that the at least the second network parameter change group excludes the single network parameter change group (e.g., the groups are non-overlapping).

In one example, the de-confusion process may further include determining that a corresponding network performance indicator change of at least a third record of the plurality of records comprising a second single network parameter change group of the plurality of network parameter change groups is different from the corresponding network performance indicator change of the at least the first record. In such case, the de-confusion process may additionally include updating the data set to replace the at least two replacement records with a single replacement record that indicates: the single network parameter change group and the second single network parameter change group and the corresponding network parameter change of the at least the first record (as well as the attributes of the at least the first respective aspect of the communication network). For instance, a prior inductive conclusion that a network performance indicator improvement is due to the at least the second network parameter change group alone may be refuted by the third record, which indicates that the improvement is instead due to the combination of the single network parameter change group and the at least the second network parameter change group (e.g., a "causal network parameter change set").

Conversely, in one example, when there are two network parameter change groups, and when a corresponding network performance indicator change of the second record of the plurality of records comprising the single network parameter change group of the plurality of network parameter change groups is analogous to the corresponding network performance indicator change of the at least the first record, the single network parameter change group may be identified as the causal network parameter change set, where the first record may be replaced with two replacement records, the first replacement record indicating the single network parameter change group and the corresponding network parameter change of the at least the second record (as well as the attributes of the at least the first respective aspect of the communication network), and where at least a second of the replacement records indicates: at least a second network parameter change group of the plurality of network parameter change groups and a different network performance indicator change from among a set of possible network performance indicator changes (e.g., increase, decrease, or no change and/or no data) (as well as the attributes of the at least the first respective aspect of the communication network). It should be noted that the de-confusion/induction process may be different and may utilize more sample records or less sample records depending on the number of concurrent network parameter change groups for the first record and depending upon whether the second record (e.g., the initial record that may be used for inductive de-confusion) has an analogous or non-analogous network performance indicator change, the number of available records (e.g., enough records to single out a causal network parameter change set comprising one or more of the network parameter change groups), and so forth.

In one example, it should be noted that when the causal network parameter change set comprises two (or more) network parameter change groups, these previously separate network parameter change groups may be merged, but are not necessarily required to be merged. For instance, it may appear that moving forward, both network parameter change groups should be performed together. However, the advantage/improvement in network performance indicator may be only for aspects of the communication network having certain attributes (which may be a small portion or non-majority). As such, the co-occurrence of these network parameter change groups may not exceed the threshold (e.g., 90% according to a Jaccard similarity, or the like).

In one example, only records in the data set that show network performance indicator improvements are further analyzed to identify causal network parameter change sets. However, in other examples, to increase the number of samples in the data set that are useable for classifier training, de-confusion may also be applied to records with no-improvement or decreases in the network performance indicator. For instance, some network parameter changes may have a positive effect on the network performance indicator, but this may be hidden by a larger negative effect from other network performance indicator changes occurring in the same time period associated with the same record (e.g., in the same day, or the like).

At optional step 320, the processing system may train a plurality of classifiers associated with the plurality of network parameter change groups in accordance with the data set that is updated at step 315. For instance, each classifier may be configured to output a respective decision output based upon one or more input attributes associated with an aspect of the communication network (e.g., a cell, sector, and/or carrier). As noted above, the plurality of classifiers may comprise at least one of: at least one decision tree classifier, at least one incremental reduced error pruning (IREP) classifier, at least one repeated incremental pruning to produce error reduction (RIPPER) classifier, or another rule induction algorithm/rule learning algorithm. In one example, a classifier may be selected for each of the plurality of network parameter change groups based upon a best performing classifier type for each of the plurality of network parameter change groups (e.g., a decision tree may exhibit the best performance for one network parameter change group, while a RIPPER classifier may exhibit the best performance for another network parameter change group).

At optional step 325, the processing system may apply at least one input attribute (e.g., an input vector comprising one or more attributes) associated with at least one aspect of the communication network (e.g., at least one "second" aspect of the communication network) to at least a portion of the plurality of classifiers to obtain a plurality of decision outputs. For instance, in one example, the processing system may select the at least the portion based upon those classifiers having a highest overall accuracy, highest average network performance indicator improvement, or a combination of the two. For instance, the top 20 classifiers can be selected, rather than applying the input vector to 100 or more classifiers for all possible network parameter change groups. It should be noted that the at least the second aspect of the communication network may be different from, but of a same type as the at least the first aspect of the communication network (e.g., a different carrier, or a different cell or sector in a different location).

At optional step 330, the processing system may select at least one of the plurality of network parameter change groups (e.g., to recommend and/or to apply to the at least one second aspect of the communication network) based upon a ranking of a decision output of a classifier associated with the at least one of the plurality of network parameter change groups in accordance with the plurality of decision outputs. For instance, optional step 330 may comprise selecting the network parameter change groups with the top decision output value(s)/score(s), decision output value(s) over a threshold, etc.

At step 335, the processing system applies at least one of the plurality of network parameter change groups to the at least one second aspect of the communication network based upon the at least one decision output of at least one classifier that is trained using the data set that is updated. As noted above, the at least one classifier may be configured to output a respective decision output based upon one or more input attributes associated with the at least one second aspect of the communication network. In addition, in one example, the at least one classifier may comprise a plurality of classifiers, where each of the plurality of classifiers is configured to output a respective decision output of a plurality of decision outputs, and where each of the plurality of decision outputs indicates whether to implement a respective one of the plurality of network parameter change groups based upon the one or more input attributes as an input to a respective one of the plurality of classifiers. In one example, step 335 may comprise implementing one or more particular values/changes for the at least one of the plurality of network parameter change groups at the at least one second aspect of the communication network. In another example, step 335 may comprise transmitting an instruction to another component (such as a SON orchestrator, a cell site/base station, etc.) to implement the network parameter change(s) of the network parameter change group(s).

At optional step 340, the processing system may generate a new record comprising the at least one of the plurality of network parameter change groups that is applied to the at least one second aspect of the communication network, the one or more input attributes associated with the at least one second aspect of the communication network, and a network performance indicator change associated with the applying of the at least one of the plurality of network parameter change groups to the at least one second aspect of the communication network. For instance, the processing system may record the network performance indicator impact after apply the network parameter change(s) at step 335.

At optional step 345, the processing system may update the data set to include the new record. In one example, step 345 may further include updating the data set in accordance with a de-confusion process such as described above in connection with step 315. For instance, further replacement records may be derived as described above to replace the new record. To illustrate, the at least one of the plurality of classifiers can include a classifier for the at least one of the plurality of network parameter change groups. In one example, the at least one of the plurality of classifiers can include one or more classifiers for one or more other network parameter change groups that may be applied to the at least one second aspect of the communication network during the same time period. For instance, multiple network parameter change groups may be applied to the at least one second aspect of the communication network on the same day (or another time period) such that the de-confusion process may again be applied to this new record.

At optional step 350, the processing system may retrain at least one of the plurality of classifiers in accordance with the new record or a plurality of replacement records derived from the new record. In one example, optional step 350 may comprise retraining the plurality of classifiers that may be trained at optional step 320. In one example, optional step 350 may be performed periodically (e.g., daily, weekly, etc.) and/or when a threshold number of new records are added to the data set, such as in accordance with optional steps 340 and 350 for additional samples.

Following step 335, or any of the optional steps 340-350, the method 300 proceeds to step 395 where the method 300 ends.

It should be noted that the method 300 may be expanded to include additional steps or may be modified to include additional operations with respect to the steps outlined above. For example, step 315 may be repeated with respect to various additional records in the data set that may exhibit "confusion," steps 315 and 320 may be repeated as new records are added to the data set, steps 315-335 or steps 315-350 may be repeated on an ongoing basis for the same or a different aspect of the communication network, and so forth. It should also be noted that the applying of the one or more network parameter changes to the at least one second aspect of the communication network at step 335 may include adding new carriers with selected network parameter settings/configurations in accordance with one or more rule sets/classifiers. In one example, steps 325-335 may be repeated for a same aspect of the communication network, e.g., as attributes change. For instance, some attributes may change relatively frequently, while others are substantially fixed, such as a hardware type etc. In one example, the method 300 may be expanded to include grouping network parameter changes into groups, e.g., based upon identification of high co-occurrences. For instance, this may include performing various similarity metric calculations as described above, and applying a threshold to determine whether and when to group network parameter changes, e.g., before or in conjunction with step 310. In one example, the method 300 may be expanded or modified to include steps, functions, and/or operations, or other features described above in connection with the example(s) of FIG. 1 and/or FIG. 2, or as described elsewhere herein. Thus, these and other modifications are all contemplated within the scope of the present disclosure.

In addition, although not specifically specified, one or more steps, functions, or operations of the example method 300 may include a storing, displaying, and/or outputting step as required for a particular application. In other words, any data, records, fields, and/or intermediate results discussed in the method(s) can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the examples of the present disclosure.

FIG. 4 depicts a high-level block diagram of a computing device or processing system specifically programmed to perform the functions described herein. For example, any one or more components or devices illustrated in FIG. 1, or described in connection with the example method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for applying at least one network parameter change group to at least one aspect of a communication network based upon a decision output of at least one classifier trained using a data set comprising at least a first record of a network parameter change that is updated with at least two replacement records based upon at least a second record, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure input/output devices 406 may also include antenna elements, antenna arrays, remote radio heads (RRHs), baseband units (BBUs), transceivers, power units, and so forth.

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for applying at least one network parameter change group to at least one aspect of a communication network based upon a decision output of at least one classifier trained using a data set comprising at least a first record of a network parameter change that is updated with at least two replacement records based upon at least a second record (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for applying at least one network parameter change group to at least one aspect of a communication network based upon a decision output of at least one classifier trained using a data set comprising at least a first record of a network parameter change that is updated with at least two replacement records based upon at least a second record (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. An apparatus comprising:
 a processing system including at least one processor; and
 a computer-readable medium storing instructions which, when executed by the processing system, cause the processing system to perform operations, the operations comprising:
  obtaining a data set comprising a plurality of records of network parameter changes in at least a portion of a communication network, wherein each record of the plurality of records comprises: at least one network parameter change occurring in a time period, at least one attribute associated with at least a first respective aspect of the communication network to which the at least one network parameter change is applied, and a corresponding network performance indicator change for the time period, wherein at least a first record of the plurality of records comprises a plurality of network parameter changes in a plurality of network parameter change groups, wherein each network parameter change group of the plurality of network parameter change groups comprises at least one network parameter change;

performing a de-confusion process on at least a portion of the data set, the de-confusion process comprising:

identifying at least a second record of the plurality of records comprising a single network parameter change group of the plurality of network parameter change groups and a corresponding network performance indicator change of the at least the second record;

determining that the corresponding network performance indicator change of the at least the second record is different from the corresponding network performance indicator change of the at least the first record; and updating the data set to replace the at least the first record with at least two replacement records, wherein at least a first of the at least two replacement records indicates: the single network parameter change group and the corresponding network parameter change of the at least the second record, and wherein at least a second of the at least two replacement records indicates: at least a second network parameter change group of the plurality of network parameter change groups and the corresponding network performance indicator change of the at least the first record; and applying at least one of the plurality of network parameter change groups to at least one second aspect of the communication network based upon at least one decision output of at least one classifier that is trained using the data set that is updated, wherein the at least one classifier is configured to output a respective decision output based upon one or more input attributes associated with the at least one second aspect of the communication network.

2. The apparatus of claim 1, wherein the at least one classifier comprises a plurality of classifiers, wherein each of the plurality of classifiers is configured to output a respective decision output of a plurality of decision outputs, wherein each of the plurality of decision outputs indicates whether to implement a respective one of the plurality of network parameter change groups based upon the one or more input attributes as an input to a respective one of the plurality of classifiers.

3. The apparatus of claim 2, wherein the operations further comprise:

applying the one or more input attributes associated with the at least one second aspect of the communication network to at least a portion of the plurality of classifiers to obtain the plurality of decision outputs.

4. The apparatus of claim 3, wherein the operations further comprise:

selecting the at least one of the plurality of network parameter change groups based upon a ranking of a decision output of a classifier associated with the at least one of the plurality of network parameter change groups in accordance with the plurality of decision outputs.

5. The apparatus of claim 1, wherein the operations further comprise:

training the plurality of classifiers associated with the plurality of network parameter change groups in accordance with the data set that is updated.

6. The apparatus of claim 5, wherein the operations further comprise:

generating a new record comprising the at least one of the plurality of network parameter change groups that is applied to the at least one second aspect of the communication network, the one or more input attributes associated with the at least one second aspect of the communication network, and a network performance indicator change associated with the applying of the at least one of the plurality of network parameter change groups to the at least one second aspect of the communication network.

7. The apparatus of claim 6, wherein the operations further comprise:

updating the data set to include the new record; and
retraining at least one of the plurality of classifiers in accordance with the new record or a plurality of replacement records derived from the new record.

8. The apparatus of claim 1, wherein the plurality of classifiers comprises at least one of:

at least one decision tree classifier;
at least one incremental reduced error pruning classifier; or
at least one repeated incremental pruning to produce error reduction classifier.

9. The apparatus of claim 1, wherein the at least the second network parameter change group excludes the single network parameter change group.

10. The apparatus of claim 1, wherein the corresponding network performance indicator change comprises a change to a composite quality index.

11. The apparatus of claim 10, wherein the composite quality index comprises a composite metric that is based on at least two of:

a data session drop rate;
a data access failure rate;
a throughput metric;
a reference signal received power metric;
a reference signal received quality metric; or
a channel quality index.

12. The apparatus of claim 1, wherein network parameter changes of the plurality of network parameter changes are organized into the plurality of network parameter change groups in accordance with a similarity metric.

13. The apparatus of claim 12, wherein two network parameter changes of the plurality of network parameter changes are included in a same network parameter change group of the plurality of network parameter change groups when the similarity metric exceeds a threshold.

14. The apparatus of claim 13, wherein the similarity metric is based upon co-occurrences of the two network parameter changes.

15. The apparatus of claim 1, wherein the de-confusion process further comprises:

determining that a corresponding network performance indicator change of at least a third record of the plurality of records comprising a second single network parameter change group of the plurality of network parameter change groups is different from the corresponding network performance indicator change of the at least the first record; and updating the data set to replace the at least two replacement records with a single replacement record that indicates: the single network parameter change group and the second single network parameter change group and the corresponding network parameter change of the at least the first record.

16. The apparatus of claim 1, wherein the communication network comprises a wireless network, wherein the at least the first respective aspect of the communication network comprises:
   a carrier;
   a sector; or
   a cell.

17. The apparatus of claim 1, wherein the at least one attribute comprises at least one of:
   a base station hardware version;
   a base station software version;
   a carrier channel frequency;
   a carrier channel bandwidth;
   a base station location;
   a carrier type;
   a base station demographic characteristic; or
   a downlink multiple input multiple output mode.

18. The apparatus of claim 1, wherein the network parameter changes are associated with network parameters comprising at least two of:
   a handover margin;
   an inter-frequency load balancing activation status;
   a downlink interference generation enable status;
   an active mode load equalization enable status;
   an average uplink load biasing parameter for secondary cell selection;
   an inter-cell load generation for physical downlink control channel enable status;
   a physical downlink control channel load level parameter;
   an inter-frequency quality threshold for reselecting a higher priority frequency;
   an reference signal received power inter-frequency handover margin for handover to a neighboring base station;
   an inter-frequency load balancing threshold for reference signal received power target cell filtering;
   a hysteresis threshold for a handover margin for handover to wideband code division multiple access;
   a minimum transmit reference signal received power level in a cell; or
   a reselection threshold for evaluating a lower priority frequency or a lower priority radio access technology.

19. A non-transitory computer-readable medium storing instructions which, when executed by a processing system including at least one processor, cause the processing system to perform operations, the operations comprising:
   obtaining a data set comprising a plurality of records of network parameter changes in at least a portion of a communication network, wherein each record of the plurality of records comprises: at least one network parameter change occurring in a time period, at least one attribute associated with at least a first respective aspect of the communication network to which the at least one network parameter change is applied, and a corresponding network performance indicator change for the time period, wherein at least a first record of the plurality of records comprises a plurality of network parameter changes in a plurality of network parameter change groups, wherein each network parameter change group of the plurality of network parameter change groups comprises at least one network parameter change;
   performing a de-confusion process on at least a portion of the data set, the de-confusion process comprising:
      identifying at least a second record of the plurality of records comprising a single network parameter change group of the plurality of network parameter change groups and a corresponding network performance indicator change of the at least the second record;
      determining that the corresponding network performance indicator change of the at least the second record is different from the corresponding network performance indicator change of the at least the first record; and
      updating the data set to replace the at least the first record with at least two replacement records, wherein at least a first of the at least two replacement records indicates: the single network parameter change group and the corresponding network parameter change of the at least the second record, and wherein at least a second of the at least two replacement records indicates: at least a second network parameter change group of the plurality of network parameter change groups and the corresponding network performance indicator change of the at least the first record; and
   applying at least one of the plurality of network parameter change groups to at least one second aspect of the communication network based upon at least one decision output of at least one classifier that is trained using the data set that is updated, wherein the at least one classifier is configured to output a respective decision output based upon one or more input attributes associated with the at least one second aspect of the communication network.

20. A method comprising:
   obtaining, by a processing system including at least one processor, a data set comprising a plurality of records of network parameter changes in at least a portion of a communication network, wherein each record of the plurality of records comprises: at least one network parameter change occurring in a time period, at least one attribute associated with at least a first respective aspect of the communication network to which the at least one network parameter change is applied, and a corresponding network performance indicator change for the time period, wherein at least a first record of the plurality of records comprises a plurality of network parameter changes in a plurality of network parameter change groups, wherein each network parameter change group of the plurality of network parameter change groups comprises at least one network parameter change;
   performing, by the processing system, a de-confusion process on at least a portion of the data set, the de-confusion process comprising:
      identifying at least a second record of the plurality of records comprising a single network parameter change group of the plurality of network parameter change groups and a corresponding network performance indicator change of the at least the second record;
      determining that the corresponding network performance indicator change of the at least the second record is different from the corresponding network performance indicator change of the at least the first record; and
      updating the data set to replace the at least the first record with at least two replacement records, wherein at least a first of the at least two replacement records indicates: the single network parameter change group and the corresponding network parameter change of the at least the second record, and wherein at least a second of the at least two replacement records indicates: at least a second network parameter change group of the plurality of network parameter change groups and the corresponding network performance indicator change of the at least the first record; and applying, by the processing system, at least one of the plurality of network parameter change groups to at least one second aspect of the communication network based upon at least one decision output of at least one classifier that is trained using the data set that is updated, wherein the at least one classifier is configured to output a respective decision output based upon one or more input attributes associated with the at least one second aspect of the communication network.

* * * * *